United States Patent
Watanabe et al.

(10) Patent No.: US 7,306,296 B2
(45) Date of Patent: Dec. 11, 2007

(54) FAILURE CHECK APPARATUS FOR CONTROL APPARATUS OF VEHICLE

(75) Inventors: Takashi Watanabe, Kariya (JP); Kenji Fujiwara, Kariya (JP); Mitsuharu Yokoyama, Kariya (JP); Kotaro Kajiwara, Kariya (JP); Hiroyuki Masuda, Okazaki (JP); Noriyuki Sakai, Okazaki (JP)

(73) Assignees: Advics Co., Ltd., Kariya, Aichi-Pref (JP); Mitsubishi Jidosya Engineering Kabushiki Kaisya, Okazaki-Shi, Aichi (JP); Mitsubishi Jidosya Kogyo Kabushiki Kaisya, Minato-Ku, Tokyo (JP)

( * ) Notice: Subject to any disclaimer, the term of this patent is extended or adjusted under 35 U.S.C. 154(b) by 0 days.

(21) Appl. No.: 11/012,338

(22) Filed: Dec. 16, 2004

(65) Prior Publication Data

US 2005/0151419 A1 Jul. 14, 2005

(30) Foreign Application Priority Data

Dec. 16, 2003 (JP) ............................. 2003-418653

(51) Int. Cl.
B60T 8/88 (2006.01)
(52) U.S. Cl. ............. 303/122.08; 303/191; 303/122.05

(58) Field of Classification Search ................ 303/122, 303/20, 122.08, 122.07, 122.06, 122.04, 303/122.05, 191; 701/80, 90; 73/121, 129
See application file for complete search history.

(56) References Cited

U.S. PATENT DOCUMENTS

| | | | | |
|---|---|---|---|---|
| 3,790,226 A | * | 2/1974 | Liggett | 303/122 |
| 4,872,730 A | * | 10/1989 | Takagi et al. | 303/139 |
| 5,492,008 A | * | 2/1996 | Schnerer et al. | 73/129 |
| 5,988,773 A | * | 11/1999 | Sawada | 303/122.08 |
| 6,237,401 B1 | * | 5/2001 | Haehn et al. | 73/129 |

FOREIGN PATENT DOCUMENTS

| | | | |
|---|---|---|---|
| JP | 63-071468 | | 3/1988 |
| JP | 8-244595 | * | 9/1996 |
| JP | 10-024826 | | 1/1998 |

* cited by examiner

Primary Examiner—Bradley King
(74) Attorney, Agent, or Firm—Buchanan Ingersoll & Rooney PC

(57) ABSTRACT

A failure check apparatus for a control apparatus of a vehicle such as ABS. When the failure check apparatus performs initial check for the ABS, it successively activates each of solenoid valves and a motor provided in the ABS, one at a time, for a predetermined time so as to determine whether a failure has occurred in the ABS. At that time, activation of the motor is started when a certain delay time elapses after the end of activation of the last solenoid valve. The delay time is a time which the vibration generated in the control apparatus upon activation of the last solenoid valve converges. Thus, interference between a vibration wave (sound wave) generated upon actuation of the solenoid valves and a vibration wave (sound wave) generated upon actuation of the motor, which differ in nature of vibration, is prevented.

15 Claims, 11 Drawing Sheets

FAILURE CHECK APPARATUS FOR CONTROL APPARATUS OF VEHICLE

BACKGROUND OF THE INVENTION

1. Field of the Invention

The present invention relates to a failure check apparatus which is applied to a control apparatus that is mounted on the body of a vehicle and that includes a plurality of types of actuators, such as an antilock brake system, and which activates the plurality of types of actuators in a failure check pattern to thereby perform failure check of the control apparatus.

2. Description of the Related Art

Heretofore, an antilock brake system (hereinafter may be referred to as "ABS" for preventing lock of wheels during travel of a vehicle has been widely provided on vehicles. In such an antilock brake system, in general, a motor for driving a hydraulic pump, a plurality of solenoid valves, and the like (that is, plurality of types of actuators) disposed in the system are activated in a predetermined pattern within a predetermined short period after startup of an engine (that is, after startup of the system) so as to perform failure check of the system (specifically, check for wire breakage, short circuit, etc.).

Since such failure check is typically performed before a vehicle begins travel; i.e., during a period in which noise from the engine is of a relatively low level and no road noise is generated, an operation sound generated upon activation of actuators such as solenoid valves and a motor is likely to be transmitted to the ears of an occupant of the vehicle as a sound harsh to the ears, whereby the occupant experiences an unpleasant sensation.

In order to cope with such a problem, a failure diagnostic apparatus for an ABS disclosed in, for example, Japanese Patent Application Laid-Open (kokai) No. S63-71468 performs ABS failure diagnosis (failure check) under the condition that the acceleration of a vehicle body or wheels is equal to or higher than a predetermined level. Further, a brake control apparatus disclosed in, for example, Japanese Patent Application Laid-Open (kokai) No. H10-24826 performs ABS failure check under the condition that the speed of a vehicle body is equal to or higher than a predetermined level. In these apparatuses, since ABS failure check is performed when noise that is unavoidably transmitted to a vehicle occupant, such as engine noise and road noise, is of a relatively high level, the occupant hardly senses, as a sound harsh to the ears, an operation sound of solenoid valves, a motor, etc. generated during the failure check. As a result, the unpleasant sensation given to the occupant by the operation sound can be mitigated.

However, in the apparatuses disclosed in the above-described publications, ABS failure check is executed after a vehicle has actually begun travel. From the viewpoint of early discovery of failure, such failure check is desired to be performed before the vehicle begins travel. In view of this, the present inventors has studied methods for mitigating unpleasant sensation given to a vehicle occupant by the above-mentioned operation sound even when the magnitude of noise transmitted to the vehicle occupant is of relatively low level, such as before the vehicle begins travel. As a result, the present inventors has found a method for mitigating unpleasant sensation given to a vehicle occupant by the above-mentioned operation sound, by means of improving the sound quality of the operation sound transmitted to the ears of the vehicle occupant.

SUMMARY OF THE INVENTION

An object of the present invention is to provide a failure check apparatus for a control apparatus of a vehicle, such as antilock brake system, that includes a plurality of types of actuators, which failure check apparatus improves the sound quality of an operation sound generated when the actuators are activated for failure check, to thereby mitigate unpleasant sensation given to a vehicle occupant by the operation sound.

To achieve the above object, the present invention provides a failure check apparatus for a control apparatus mounted on a body of a vehicle and including actuators of different types which differ in nature of vibration generated in the control apparatus upon activation thereof, comprising failure check means for activating the actuators in a pattern for failure check so as to determine whether a failure has occurred in the control apparatus. The failure check means successively activates the actuators, one type at a time, in such a manner that an actuator of a first type is first activated, and an actuator of a second type is then activated after activation of the actuator of the first type ends and a vibration generated in the control apparatus upon activation of the actuator of the first type converges to a certain degree. The certain degree is such that an occupant of the vehicle becomes substantially unable to hear a sound stemming from the vibration generated in the control apparatus.

Preferably, the control apparatus is an antilock brake system which prevents locking of wheels during travel of the vehicle and which includes actuators of two types; and an actuator of one type includes a plurality of solenoid valves for adjusting brake hydraulic pressures within respective wheel cylinders of the wheels, and an actuator of the other type includes a motor for driving a hydraulic pump which pumps brake fluid discharged to a reservoir as a result of operation of the antilock bake system.

In general, in many apparatus for failure check for a vehicle control apparatus such as the above-mentioned ABS, a plurality of actuators provided in the control apparatuses are successively activated so as to successively check whether a drive circuit for the actuator to be activated has a wire breakage, short circuit, or a like failure. Now, there will be considered the case where the control apparatus includes actuators of different types which differ in nature (e.g., waveform, period, etc.) of vibration generated in the control apparatus upon activation thereof, such as a plurality of solenoid valves and a pump drive motor provided in the ABS.

In this case, after completion of activation of an actuator of a first type (e.g., a plurality of solenoid valves), activation of an actuator of a second type (e.g., a motor) may be started before convergence, through attenuation, of the vibration generated in the control apparatus upon activation of the actuator of the first type. However, in this case, operation sound tends to be transmitted to the ears of an occupant of the vehicle as a sound harsh to the ears.

The present inventors found that when vibrations which differ in nature of vibration (e.g., waveform, period, etc.) are simultaneously generated in the control apparatus, interference occurs between vibration waves (sound waves), and a resultant combined vibration wave (that is, a sound wave) includes harmonic distortion, which may be transmitted to a vehicle occupant as a sound harsh to the ears.

As described above, the failure check apparatus of the present invention is configured to successively activate the actuators, one type at a time, in such a manner that an actuator of a first type is first activated, and an actuator of a second type is then activated after activation of the actuator of the first type ends and a vibration generated in the control apparatus upon activation of the actuator of the first type converges to a certain degree. In this case, the above-mentioned harmonic distortion stemming from interference is not generated, and the sound quality of operation sound transmitted to the ears of a vehicle occupant is improved. As a result, the unpleasant sensation given to a vehicle occupant by the above-mentioned operation sound can be mitigated even when the magnitude of noise transmitted to the vehicle occupant is relatively small, such as before the vehicle begins travel.

In the failure check apparatus according to the present invention, the failure check means is preferably configured to start activation of the actuator of the second type immediately after the vibration generated in the control apparatus upon activation of the actuator of the first type converges to the certain degree. In this case, the time between start and end of the failure check for the control apparatus can be shortened.

In the failure check apparatus according to the present invention, the failure check means preferably performs the failure check for the control apparatus within a predetermined period after startup of the control apparatus. In this case, a failure of the control apparatus can be found in an early stage, and as a result, a user of the vehicle on which the control apparatus is mounted can cope with the failure through, for example, repairing the control apparatus, at an early stage.

In the case where the actuator of the first type includes a plurality of operating devices (e.g., solenoid valves), when the failure check means activates the actuator of the first type, preferably, the failure check means successively activates the operating devices, one device at a time, in such a manner that after completion of activation of one operating device, activation of a next operating device is started before convergence of a vibration generated in the control apparatus upon activation of the one operating device.

Since the plurality of operating devices are actuators of the same type, the natures of their vibrations are also the same. Even when vibration waves of the same nature are simultaneously generated in the control apparatus, a resultant combined vibration wave does not include harmonic distortion, which is likely to be transmitted to a vehicle occupant as a sound harsh to the ears. Accordingly, the above-described configuration which starts activation of a next operating device before convergence of a vibration generated in the control apparatus upon activation of the first operating device can shorten the time between start and end of activation of the actuator of the first type (accordingly, the time between start and end of failure check for the control apparatus).

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
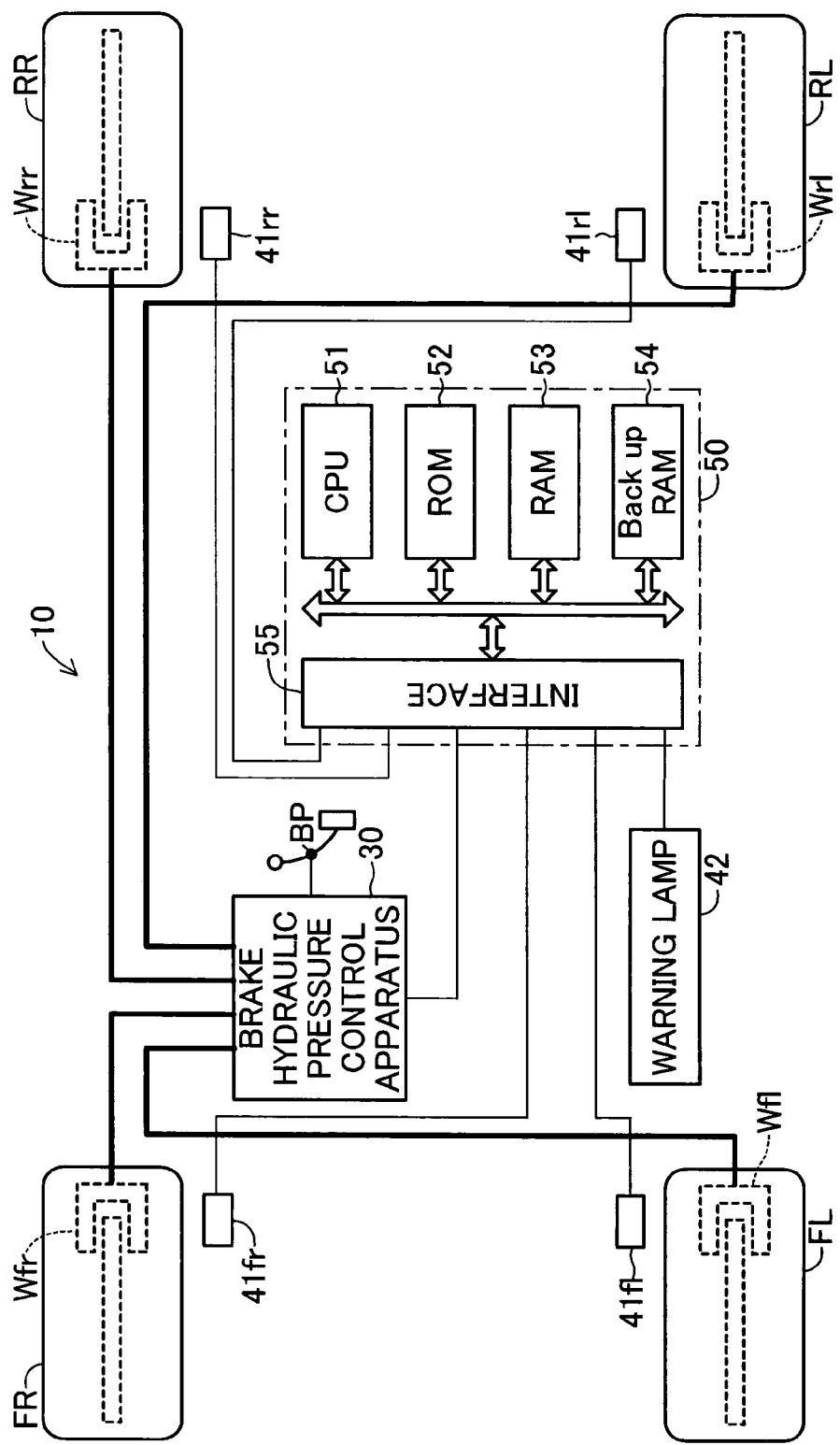
FIG. 1 is a schematic diagram of a vehicle equipped with a vehicle motion control apparatus including a failure check apparatus according to an embodiment of the present invention.

An embodiment of the present invention will be described with reference to the drawings. FIG. 1 schematically shows the structure of a vehicle equipped with a vehicle motion control apparatus 10 including a failure check apparatus for a brake hydraulic pressure control apparatus according to the present embodiment. The illustrated vehicle is a four-wheel, rear-wheel drive (FR) vehicle having two front wheels (a front left wheel FL and a front right wheel FR), which are non-drive wheels (follower wheels), and two rear wheels (a rear left wheel RL and a rear right wheel RR), which are drive wheels.

Figure 2:
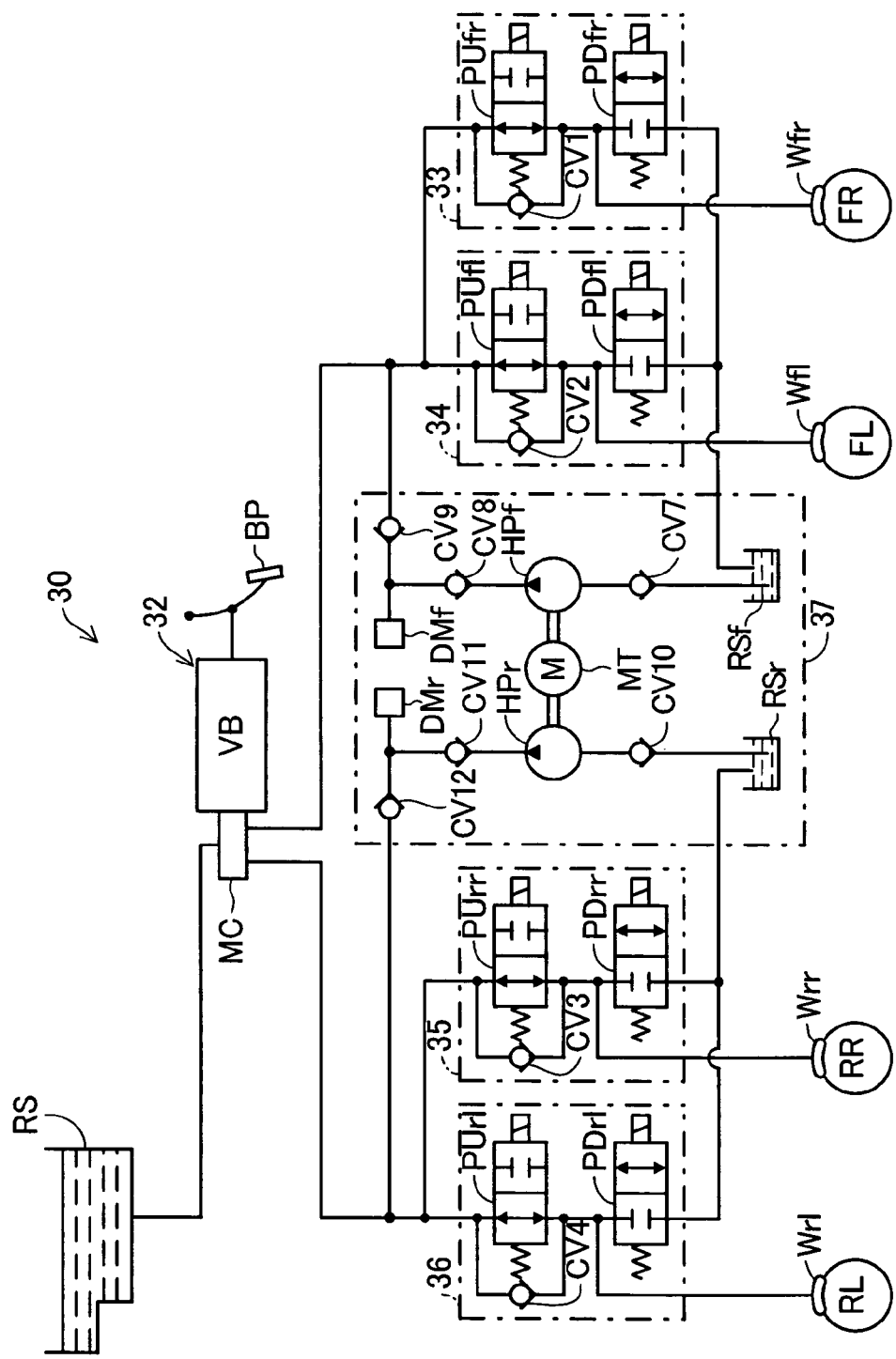
FIG. 2 is a schematic diagram of a brake hydraulic pressure control apparatus shown in FIG. 1.

This vehicle motion control apparatus 10 includes a brake hydraulic pressure control apparatus 30 for generating braking force in each wheel by means of brake hydraulic pressure. As schematically shown in FIG. 2, the brake hydraulic pressure control apparatus 30 includes a brake hydraulic pressure generating section 32 which generates brake hydraulic pressure corresponding to the operating force of a brake pedal BP; an FR brake hydraulic pressure adjusting section 33, an FL brake hydraulic pressure adjusting section 34, an RR brake hydraulic pressure adjusting section 35, and an RL brake hydraulic pressure adjusting section 36, which can adjust the brake hydraulic pressures supplied to corresponding wheel cylinders Wfr, Wfl, Wrr, and Wrl respectively installed on the wheels FR, FL, RR, and RL; and a return brake fluid supply section 37.

The brake hydraulic pressure generating section 32 includes a vacuum booster VB which operates in response to operation of the brake pedal BP, and a master cylinder MC which is linked to the vacuum booster VB. The vacuum booster VB utilizes the pressure (negative pressure) of air within an intake pipe of an unillustrated engine so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder hydraulic pressure corresponding to the boosted operating force. The master cylinder MC also generates from the second port a second master cylinder hydraulic pressure which is substantially the same as the first master cylinder hydraulic pressure and which corresponds to the boosted operating force. The structures and operations of the master cylinder MC and the vacuum booster VB are well known, and therefore an explanation of the details thereof will be omitted. In this manner, the master cylinder MC and the vacuum booster VB generate first and second master cylinder hydraulic pressures corresponding to the operating force of the brake pedal BP.

The first port of the master cylinder MC is connected to the upstream side of the FR brake hydraulic pressure adjusting section 33 and the upstream side of the FL brake hydraulic pressure adjusting section 34. Similarly, the second port of the master cylinder MC is connected to the upstream side of the RR brake hydraulic pressure adjusting section 35 and the upstream side of the RL brake hydraulic pressure adjusting section 36. Thus, the first master cylinder hydraulic pressure is supplied to the upstream side of the FR brake hydraulic pressure adjusting section 33 and the upstream side of the FL brake hydraulic pressure adjusting section 34, and the second master cylinder hydraulic pressure is supplied to the upstream side of the RR brake hydraulic pressure adjusting section 35 and the upstream side of the RL brake hydraulic pressure adjusting section 36.

The FR brake hydraulic pressure adjusting section 33 consists of a pressure-increasing valve PUfr, which is a normally-open solenoid valve of a 2-port, 2-position type, and a pressure-reducing valve PDfr, which is a normally-closed solenoid valve of a 2-port, 2-position type. When the pressure-increasing valve PUfr is in its first position (a position in a non-excited (OFF) state) shown in FIG. 2, it establishes communication between the upstream side of the FR brake hydraulic pressure adjusting section 33 and the wheel cylinder Wfr. When the pressure-increasing valve PUfr is in its second position (a position in an excited (ON) state), it breaks the communication between the upstream side of the FR brake hydraulic pressure adjusting section 33 and the wheel cylinder Wfr. When the pressure-reducing valve PDfr is in its first position (a position in a non-excited (OFF) state) shown in FIG. 2, it breaks communication between the wheel cylinder Wfr and a reservoir RSf. When the pressure-reducing valve PDfr is in its second position (a position in an excited (ON) state), it establishes the communication between the wheel cylinder Wfr and the reservoir RSf.

With this structure, when the pressure-increasing valve PUfr and the pressure-reducing valve PDfr are in their first positions, the hydraulic pressure in the wheel cylinder Wfr is increased upon supply of pressurized brake fluid from the upstream side of the FR brake hydraulic pressure adjusting section 33 into the wheel cylinder Wfr. When the pressure-increasing valve PUfr is in the second position and the pressure-reducing valve PDfr is in the first position, regardless of the hydraulic pressure in the upstream side of the FR brake hydraulic pressure adjusting section 33, the hydraulic pressure in the wheel cylinder Wfr at the time of changeover is maintained. When the pressure-increasing valve PUfr and the pressure-reducing valve PDfr are in their second positions, the brake fluid within the wheel cylinder Wfr is allowed to return to the reservoir RSf, whereby the hydraulic pressure in the wheel cylinder Wfr is decreased.

A check valve CV1 which allows flow of the brake fluid in only one direction from the wheel cylinder Wfr side to the upstream side of the FR brake hydraulic pressure adjusting section 33 is connected in parallel with the pressure-increasing valve PUfr. As a result, when the brake pedal BP is released after being operated, the brake hydraulic pressure in the wheel cylinder Wfr is rapidly decreased.

Similarly, the FL brake hydraulic pressure adjusting section 34, the RR brake hydraulic pressure adjusting section 35, and the RL brake hydraulic pressure adjusting section 36 comprise a pressure-increasing valve PUfl and a pressure-reducing valve PDfl, a pressure-increasing valve PUrr and a pressure-reducing valve PDrr, and a pressure-increasing valve PUrl and a pressure-reducing valve PDrl, respectively. By controlling the positions of each pressure-increasing valve and pressure-reducing valve, the brake hydraulic pressure in the wheel cylinder Wfl, the wheel cylinder Wrr, and the wheel cylinder Wrl can be increased, maintained, or decreased. Checks valves CV2, CV3, and CV4 are provided in parallel with the pressure-increasing valves PUfl, PUrr, and PUrl, respectively, to provide the same function as that of the check valve CV1.

The return brake fluid supply section 37 includes a DC motor MT, and two hydraulic pumps HPf and HPr simultaneously driven by the motor MT. The hydraulic pump HPf pumps, via a check valve CV7, the brake fluid returned from the pressure reducing values PDfr and PDfl to the reservoir RSf, and supplies the pumped brake fluid to the upstream sides of the FR brake hydraulic pressure adjusting section 33 and the FL brake hydraulic pressure adjusting section 34 via check valves CV8 and CV9.

Similarly, the hydraulic pump HPr pumps, via a check valve CV10, the brake fluid returned from the pressure reducing values PDrr and PDrl to the reservoir RSr, and supplies the pumped brake fluid to the upstream sides of the RR brake hydraulic pressure adjusting section 35 and the RL brake hydraulic pressure adjusting section 36 via check valves CV11 and CV12. Notably, in order to reduce pulsations of discharge pressures of the hydraulic pumps HPf and HPr, dampers DMf and DMr are disposed in a hydraulic circuit between the check valves CV8 and CV9 and a hydraulic circuit between the check valves CV11 and CV12, respectively.

In actuality, each of the above-described brake hydraulic pressure generating section 32, brake hydraulic pressure adjusting sections 33 to 36, and return brake fluid supply section 37 (accordingly, the solenoid valves and the motor MT) is disposed in a single housing, and the brake hydraulic pressure control apparatus 30 constitutes a single unit, which is disposed at a predetermined position within the unillustrated engine compartment of the vehicle shown in FIG. 1.

With the structure described above, when all the solenoid valves are in their first positions, the brake hydraulic pressure control apparatus 30 supplies to each wheel cylinder a brake hydraulic pressure corresponding to the operating force of the brake pedal BP. In this state, it become possible to decrease only the brake hydraulic pressure in, for example, the wheel cylinder Wrr by a prescribed amount through control of the pressure-increasing valve PUrr and the pressure-reducing valve PDrr. That is, the brake hydraulic pressure control apparatus 30 can individually decrease the brake hydraulic pressure in the wheel cylinder of each wheel from the brake hydraulic pressure corresponding to the operating force of the brake pedal BP.

Referring back to FIG. 1, the vehicle motion control apparatus 10 includes wheel speed sensors 41fl, 41fr, 41rl, and 41rr which each output a signal having a pulse each time the corresponding wheel rotates by a prescribed angle; a warning lamp 42 for reporting to a user that a failure (anomaly) has occurred in the brake hydraulic pressure control apparatus 30; and an electronic controller 50.

The electronic controller 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus.

The interface 55 is connected to the wheel speed sensors 41 and the warning lamp 42. The interface 55 supplies signals from the wheel speed sensors 41 to the CPU 51. Further, in accordance with instructions from the CPU 51, the interface 55 outputs a lighting signal to the warning lamp 42, and also outputs drive signals to a relay and the base terminals of power transistors which are interposed in a drive circuit to be described later, which is adapted to drive the solenoid valves (pressure-increasing valve PU and pressure-reducing valve PD) and the motor MT of the brake hydraulic pressure control apparatus 30.

In the following description, the symbol "I" appended to various variables and the like collectively represents the symbols fl, fr, rl, and rr and indicates that the particular variable or the like applies to all of the wheels FR, FL, etc. of the vehicle. For example, the pressure-increasing valve PU** collectively indicates the pressure-increasing valve PUfl for the front left wheel, the pressure-increasing valve PUfr for the front right wheel, the pressure-increasing valve PUrl for the rear left wheel, and the pressure-increasing valve PUrr for the rear right wheel.

Figure 3:
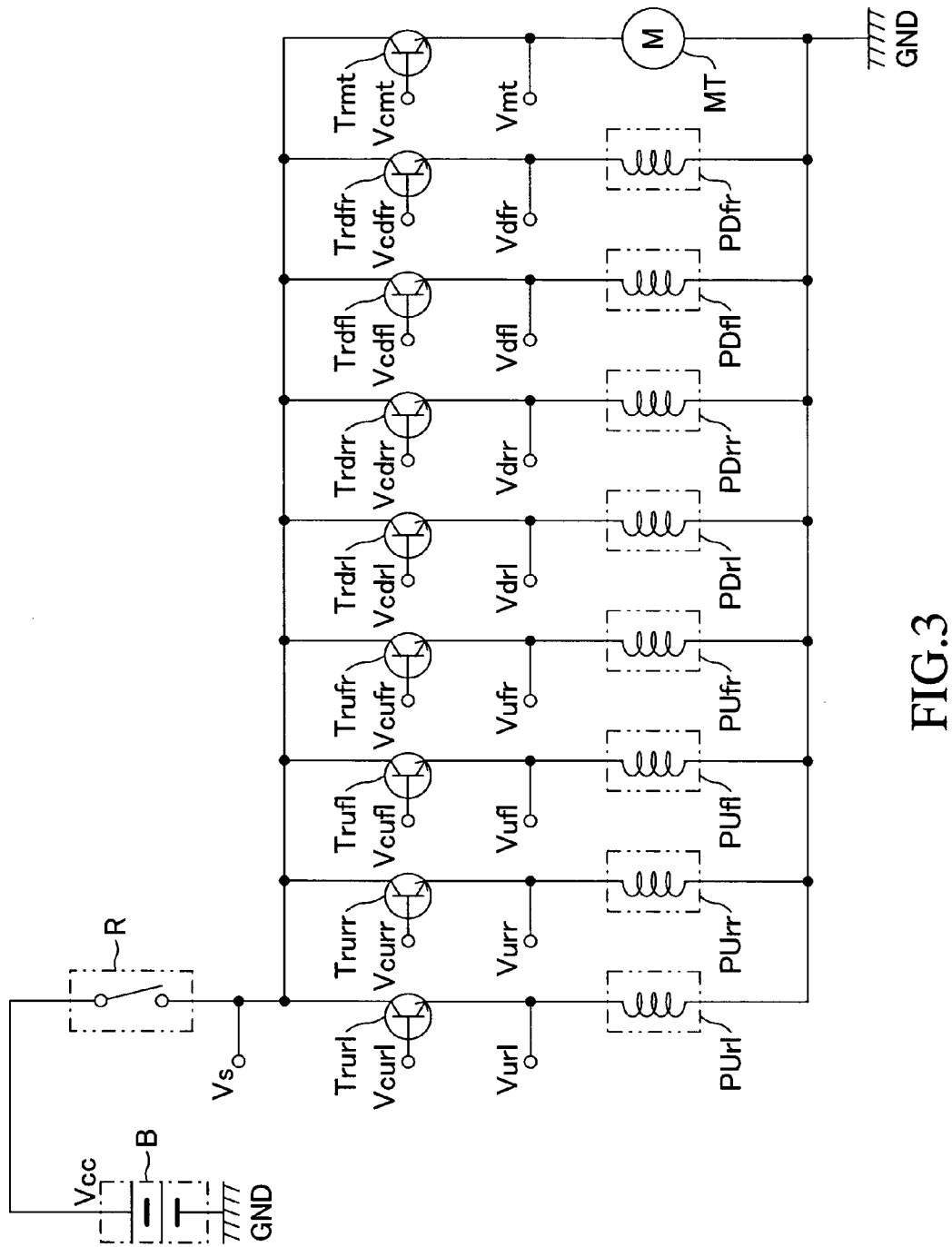
FIG. 3 is a schematic diagram of a drive circuit for driving respective solenoid valves and a motor shown in FIG. 2.

FIG. 3 is a diagram schematically showing the configuration of the drive circuit which is incorporated in the electronic controller 50 so as to drive (activate) the solenoid valves (pressure-increasing valve PU and pressure-reducing valve PD) and the motor MT. As shown in FIG. 3, each of a solenoid coil of the pressure-increasing valve PU, a solenoid coil of the pressure-reducing valve PD, and the motor MT has a first grounded terminal, and a second terminal connected to the emitter terminal of a corresponding power transistor Tr, serving as a switching element. The collector terminal of each power transistor Tr is connected to the positive terminal of a battery B (voltage Vcc) of the vehicle via a relay R.

The relay R is configured to be selectively maintained in an ON state or an OFF state in accordance with a drive signal from the CPU 51. In an ordinary state, the relay R is maintained in the ON state, and only in the case where an anomaly occurs in the brake hydraulic pressure control apparatus 30 as will be described later, the relay R is brought into the OFF state. Therefore, in the ordinary state, the collector terminals of the power transistors Tr are all maintained at the battery voltage Vcc.

The electrical potential of the base terminal of each power transistor Tr is controlled to a High level or a Low level in accordance with a corresponding drive signal from the CPU 51. Each power transistor Tr is in an ON state when electrical potential of the base terminal thereof is at the High level, and is in an OFF state when the electrical potential of the base terminal thereof is at the Low level.

By virtue of the above-described configuration, in a period during which the relay R is maintained in the ON state, each of the pressure-increasing valve PU, the pressure-reducing valve PD, and the motor MT enters a driven (ON) state when the electrical potential of the base terminal of the corresponding power transistor Tr is controlled to the High level, and thus the voltage Vcc is applied thereto; and enters a non-driven (OFF) state when the electrical potential of the base terminal of the corresponding power transistor Tr is controlled to the Low level, and thus application of the voltage Vcc is stopped. Meanwhile, in a period during which the relay R is maintained in the OFF state, each of the pressure-increasing valve PU, the pressure-reducing valve PD, and the motor MT is always maintained in the non-driven state, because the voltage Vcc is not applied thereto, irrespective of the electrical potential of the base terminal of the corresponding power transistor Tr.

Moreover, in order to enable performance of failure check for the drive circuit, which will be described later, signals respectively representing the electrical potential Vs of the collector terminals of the power transistors Tr, and the electrical potentials Vu, Vd, and Vmt of the second terminals of the respective actuators are supplied to the CPU 51 via the interface 55.

The brake hydraulic pressure control apparatus 30 (CPU 51) functions as an antilock brake system (ABS) which performs ABS control, which is the control of properly decreasing the brake hydraulic pressure for a specific wheel from the brake hydraulic pressure corresponding to the operating force of the brake pedal BP, when the specific wheel tends to lock while the driver is operating the brake pedal BP. Since the details of the ABS control are well known, repeated description therefor is omitted.

Outline of Failure Check for Brake Hydraulic Pressure Control Apparatus

Next, there will be described an outline of failure check performed by the failure check apparatus (hereinafter may be referred to as "present apparatus") for the brake hydraulic pressure control apparatus 30 (ABS) according to the present embodiment and incorporated in the vehicle motion control apparatus 10. In principle, the present apparatus starts and executes a failure check operation for the brake hydraulic pressure control apparatus 30 upon elapse of a predetermined short period of time after an unillustrated ignition switch (hereinafter referred to as "IG") has been switched from an OFF state to an ON state (within a predetermined period after startup of the brake hydraulic pressure control apparatus 30). Therefore, in the following description, the failure check operation in the present embodiment will be called "initial check."

In a period of initial check for the brake hydraulic pressure control apparatus 30, the present apparatus successively drives (actually activates) the pressure-increasing valve PU, the pressure-reducing valve PD, and the motor MT (which are actuators provided in the brake hydraulic pressure control apparatus 30), one at a time, for a predetermined period of time so as to determine whether a failure such as wire breakage or short circuit has occurred in the drive circuit shown in FIG. 3, to thereby determine whether a failure is present in the brake hydraulic pressure control apparatus 30.

Figure 4:
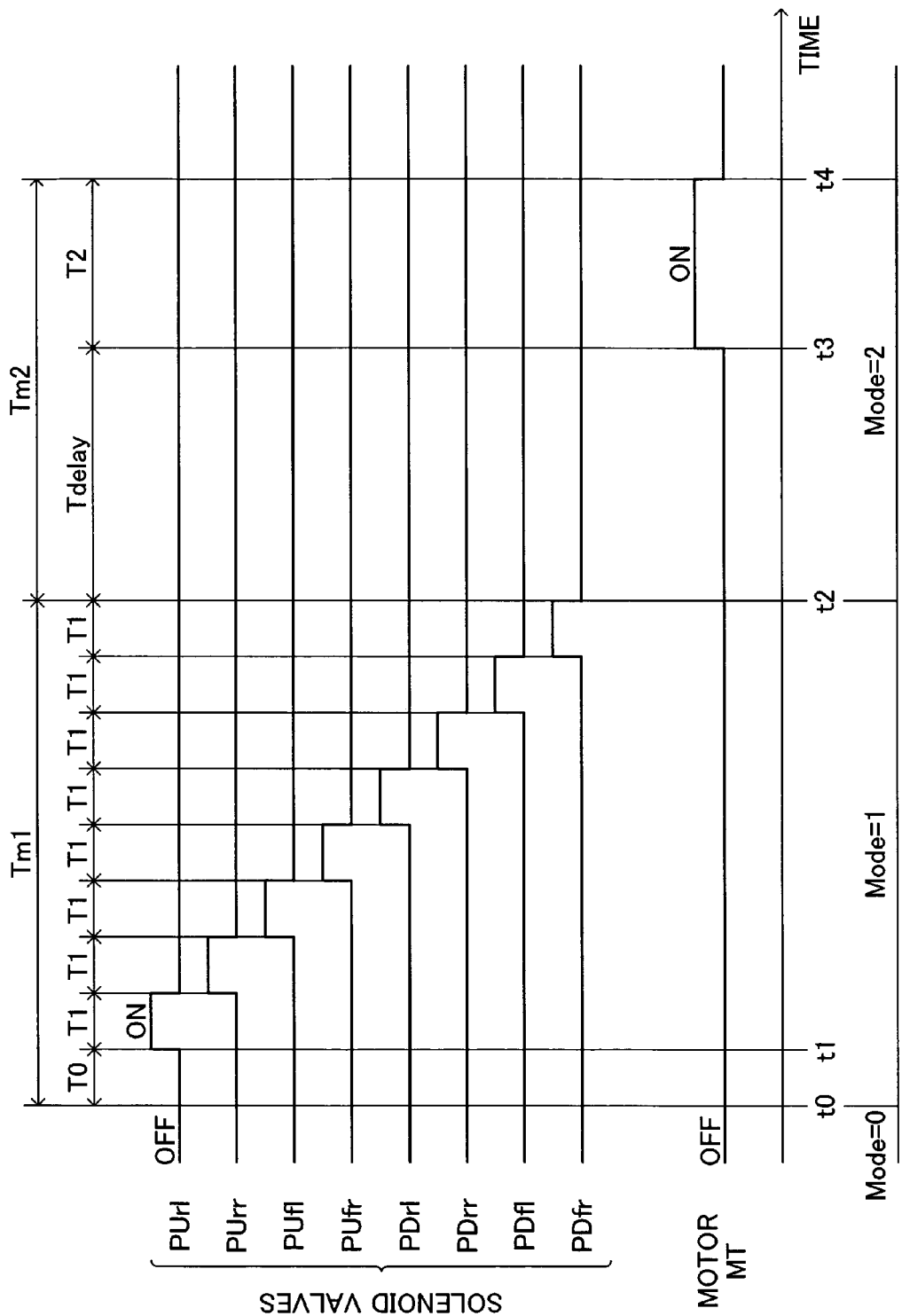
FIG. 4 is a time chart showing a drive pattern according to which the CPU shown in FIG. 1 drives respective actuators provided in the brake hydraulic pressure control apparatus shown in FIG. 2, in order to perform initial check of the brake hydraulic pressure control apparatus.

Specifically, as shown in FIG. 4, which is a time chart showing a drive pattern for each actuator, when initial check start conditions (elapse of a predetermined short period of time after IG being turned ON, and other conditions) are satisfied at time t0, the present apparatus generates drive signals for maintaining all the actuators in their OFF states for a time period T0 (e.g., 3 msec), and detects the electrical potential Vs of the collector terminals of the power transistors Tr, and the electrical potentials Vu, Vd, and Vmt of the second terminals of the respective actuators.

In this state, when the drive circuit is normal, only the electrical potential Vs ought to be equal to the battery voltage Vcc, and the remaining electrical potentials Vu, Vd, and Vmt ought to be zero. Therefore, at the time when the respective electrical potentials are detected, the present apparatus checks whether the detected electrical potentials assume the above-mentioned values.

When time t1 has arrived after elapse of the time period T0, the present apparatus generates a drive signal for maintaining only the pressure-increasing valve PUrl in its ON state for a time period T1 (e.g., 3 msec), and newly detects the respective electrical potentials. In this state, when the drive circuit is normal, the electrical potentials Vs and Vurl ought to be equal to the battery voltage Vcc, and the remaining electrical potentials Vu, Vd, and Vmt ought to be zero. Therefore, at the time when the respective electrical potentials are newly detected, the present apparatus checks whether the newly detected electrical potentials assume the above-mentioned values.

After elapse of the time period T1, the present apparatus sequentially generates drive signals for sequentially bringing the remaining seven solenoid valves into their ON state in corresponding time periods T1, as shown in FIG. 4, and detects the respective electrical potentials in each stage. In these stages, when the drive circuit is normal, the electrical potential Vs and the potential (Vu or Vd) corresponding to one solenoid valve in the ON state ought to be equal to the battery voltage Vcc, and the remaining electrical potentials Vu, Vd, and Vmt ought to be zero. Therefore, every time the respective electrical potentials are newly detected, the present apparatus checks whether the newly detected electrical potentials assume the above-mentioned values.

Upon having reached time t2 at which an operation of maintaining the pressure-reducing valve PDfr (the last one of the eight solenoid valves) in the ON state ends, the present apparatus generates drive signals for maintaining all the actuators in their OFF states. The operation during the period between t0 to t2 will be called "operation in the first mode (Mode=1)." The operation in the first mode is assumed to require a time period Tm1.

Subsequently, after time t2, the present apparatus continues the generation of the drive signals for maintaining all the actuators in their OFF states for a delay time Tdelay, which is set as described later. Upon having reached time t3 after elapse of the delay time Tdelay, the present apparatus generates a drive signal for maintaining only the motor MT in its ON state for a time period T2 (e.g., 50 msec), and detects the above-mentioned respective electrical potentials. In this state, when the drive circuit is normal, the electrical potentials Vs and Vmt ought to be equal to the battery voltage Vcc, and the remaining electrical potentials Vu and Vd ought to be zero. Therefore, at the time when the respective electrical potentials are newly detected, the present apparatus again checks whether the detected electrical potentials assume the above-mentioned values.

Upon having reached time t4 after elapse of the time period T2, the present apparatus generates drive signals for maintaining all the actuators in their OFF states, and ends the actuator drive processing in relation to the initial check for the brake hydraulic pressure control apparatus 30. The operation during the period between t2 to t4 will be called "operation in the second mode (Mode=2)."

After that, on the basis of the results of checking of the respective electrical potentials performed 9 times in total during the operations in the first and second modes, the present apparatus determines whether wire breakage, short circuit, or the like has occurred in the drive circuit shown in FIG. 3. When the present invention determines that an electrical failure, such as wire breakage or short circuit, has occurred, the present apparatus turns the relay R off, specifies the details of the failure and the location of the failure occurrence, etc., and stores in the backup RAM 54 an anomaly code corresponding to the specified details. The above is the outline of failure check (initial check) for the brake hydraulic pressure control apparatus 30 according to the present invention.

Method of Setting a Proper Delay Time Tdelay

When the above-described initial check for the brake hydraulic pressure control apparatus 30 is performed, vibration is generated in the unit of the brake hydraulic pressure control apparatus 30 as a result of activation of the solenoid valves and the motor MT. Such vibration is transmitted, as an operation sound, to the ears of an occupant of the vehicle via the unit itself and the interior of an unillustrated engine compartment of the vehicle shown in FIG. 1 (hereinafter these will be collectively called "body vibration transmission system", as well as via air present in the passenger compartment of the vehicle.

The nature (e.g., waveform, frequency) of a vibration generated in the body vibration transmission system upon actuation of each solenoid valve (specifically, upon collision of a valve body with a valve seat or the like) differs from that of a vibration generated in the body vibration transmission system upon actuation of the motor MT (specifically, upon rotation of a rotary member of the motor).

Figure 5:
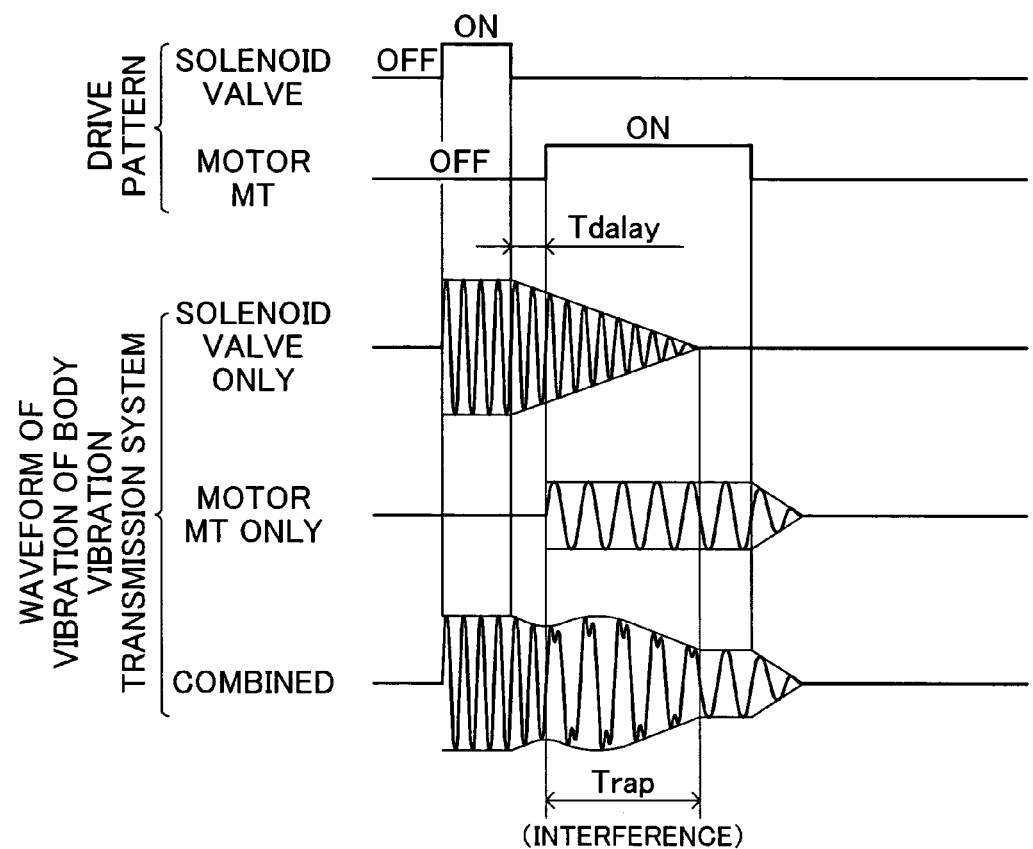
FIG. 5 is a chart showing interference produced between a vibration wave generated in a body vibration transmission system upon activation of a certain solenoid valve and a vibration wave generated in the system upon activation of the motor for the case where the delay time between completion of activation of the solenoid valve and start of activation of the motor is short.

In such a case, when the above-described delay time Tdelay is short as shown in FIG. 5, after completion of activation of the last solenoid valve (activation of an actuator of a first type), activation of the motor MT (activation of an actuator of a second type) is started before the vibration generated in the body vibration transmission system upon activation of the solenoid valve has not been converged as a result of attenuation. Therefore, vibrations of different natures are simultaneously generated in the body vibration transmission system over a period of time Trap between the start of activation of the motor MT and a point in time at which the vibration generated in the body vibration transmission system upon activation of the solenoid valve converges as a result of attenuation.

Through research and experiments, the present inventors have found that interference occurs between the vibration waves, and a resultant combined vibration wave (that is, sound wave) has an increased amplitude and includes harmonic distortion, so that the above-mentioned operation sound is likely to be transmitted, as noise, to the ears of a vehicle occupant, and the occupant experiences an unpleasant sensation.

In view of the above, the present inventors have determined, by way of experiments, a convergence time required by the vibration generated in the body vibration transmission system upon activation of the solenoid valve to converge as a result of attenuation after completion of activation of the solenoid valve. The vibration was determined to have "converged" when an occupant of a vehicle as shown in FIG. 1 in which the unit of the brake hydraulic pressure control apparatus 30 actually was mounted become substantially unable to hear a sound generated in the body vibration transmission system upon activation of the solenoid valve. In the present apparatus, a convergence time obtained in the above-described manner (e.g., 100 msec to 500 msec) is set as the above-mentioned delay time Tdelay.

Figure 6:
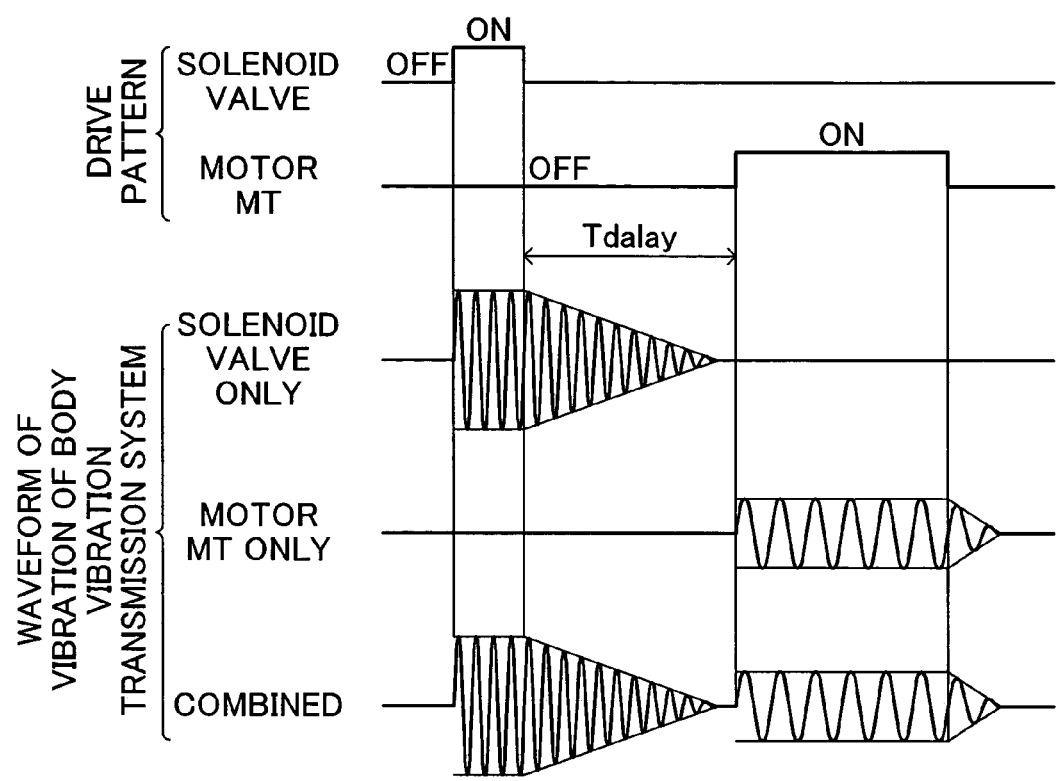
FIG. 6 is a chart showing the waveform of a vibration generated in the body vibration transmission system for the case where activation of the motor is started after elapse, after completion of activation of the solenoid valve, of a delay time within which vibration generated in the body vibration transmission system upon activation of a certain solenoid valve converges.

As a result, shown in FIG. 6, activation of the motor MT is started immediately after convergence of the vibration generated in the body vibration transmission system upon activation of the solenoid valve. Therefore, generation of the above-mentioned interference is prevented, and the sound quality of the operation sound transmitted to the ears of the vehicle occupant is improved, so that the operation sound is not harsh to the ears. Therefore, the slower the speed of attenuation of vibration (the greater the likelihood of generation of the above-mentioned interference) in the body vibration transmission system of a vehicle to which the present invention is applied, the greater the effect of improving sound quality according to the present invention. The above is the outline of the method of setting a proper delay time Tdelay in the present apparatus.

Actual Operation

The actual operation of the vehicle motion control apparatus 10, which includes the failure check apparatus for the brake hydraulic pressure control apparatus 30 (ABS) according to the embodiment of the present invention having the above-described structure, will be explained while referring to FIGS. 7 to 11, which show, in the form of flowcharts, routines which are executed by the CPU 51 of the electronic controller 50.

Figure 7:
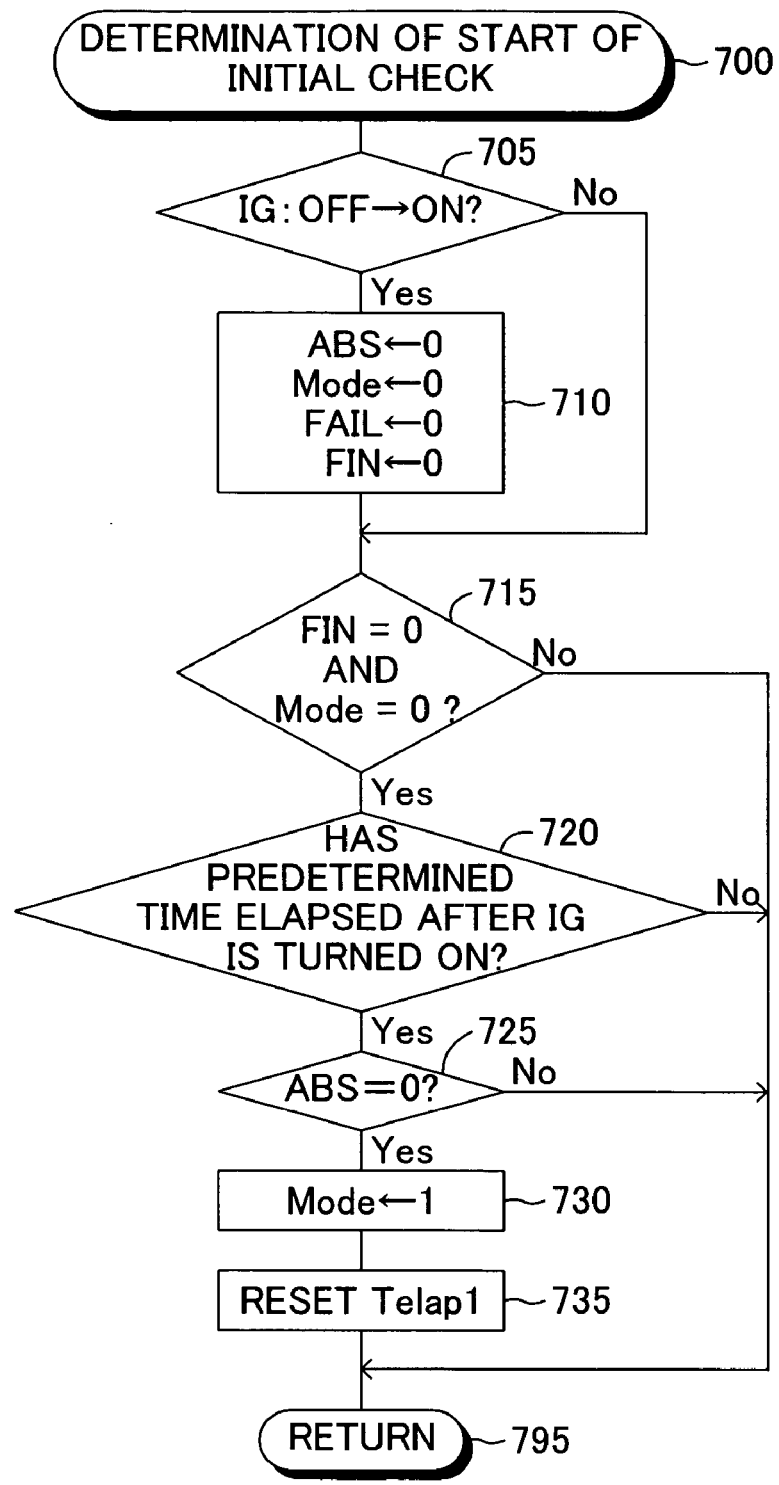
FIG. 7 is a flowchart showing a routine which the CPU shown in FIG. 1 executes in order to determine whether to start an initial check.
Figure 8:
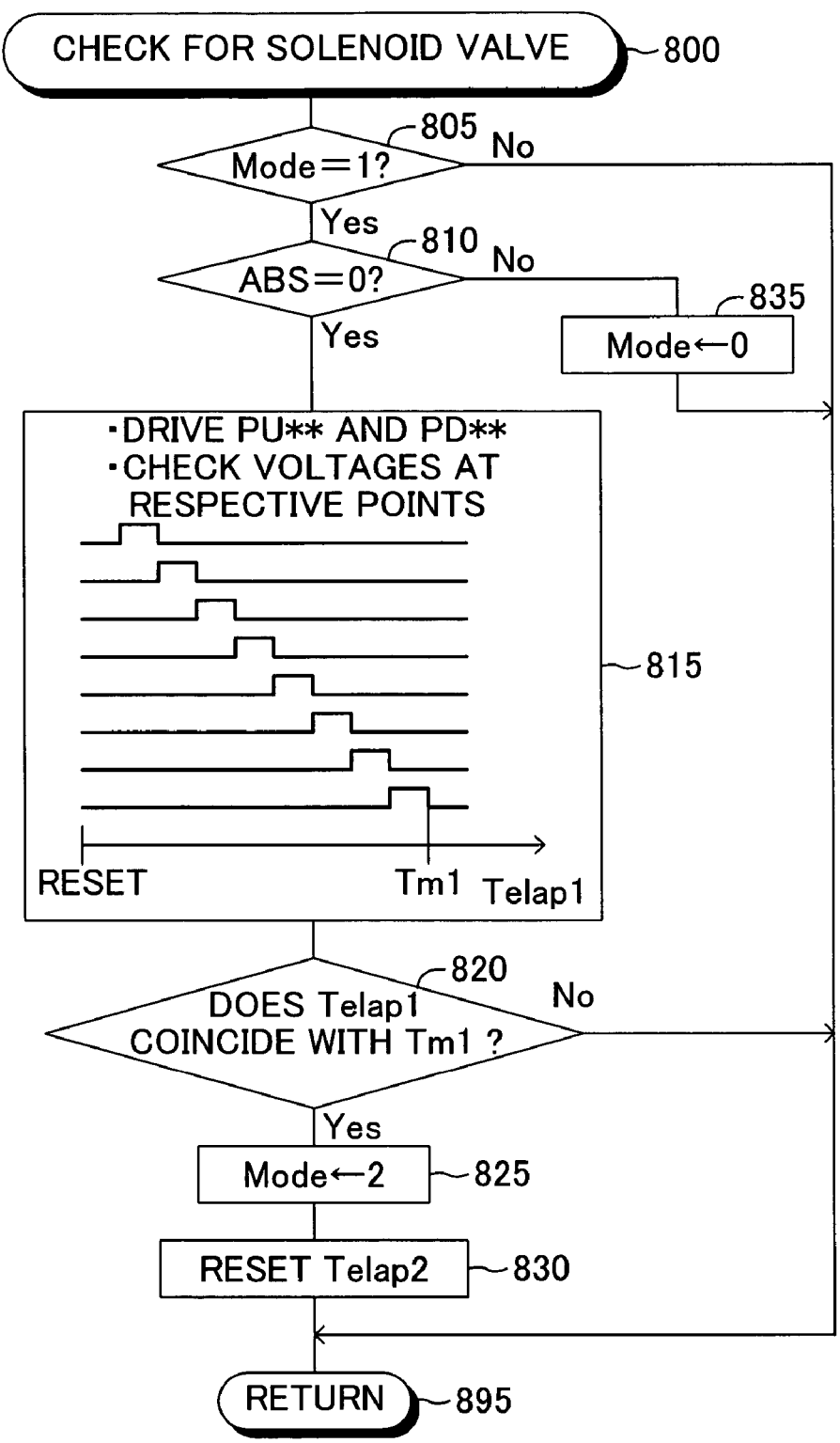
FIG. 8 is a flowchart showing a routine which the CPU shown in FIG. 1 executes in order to check each solenoid valve (operation in a first mode)
Figure 9:
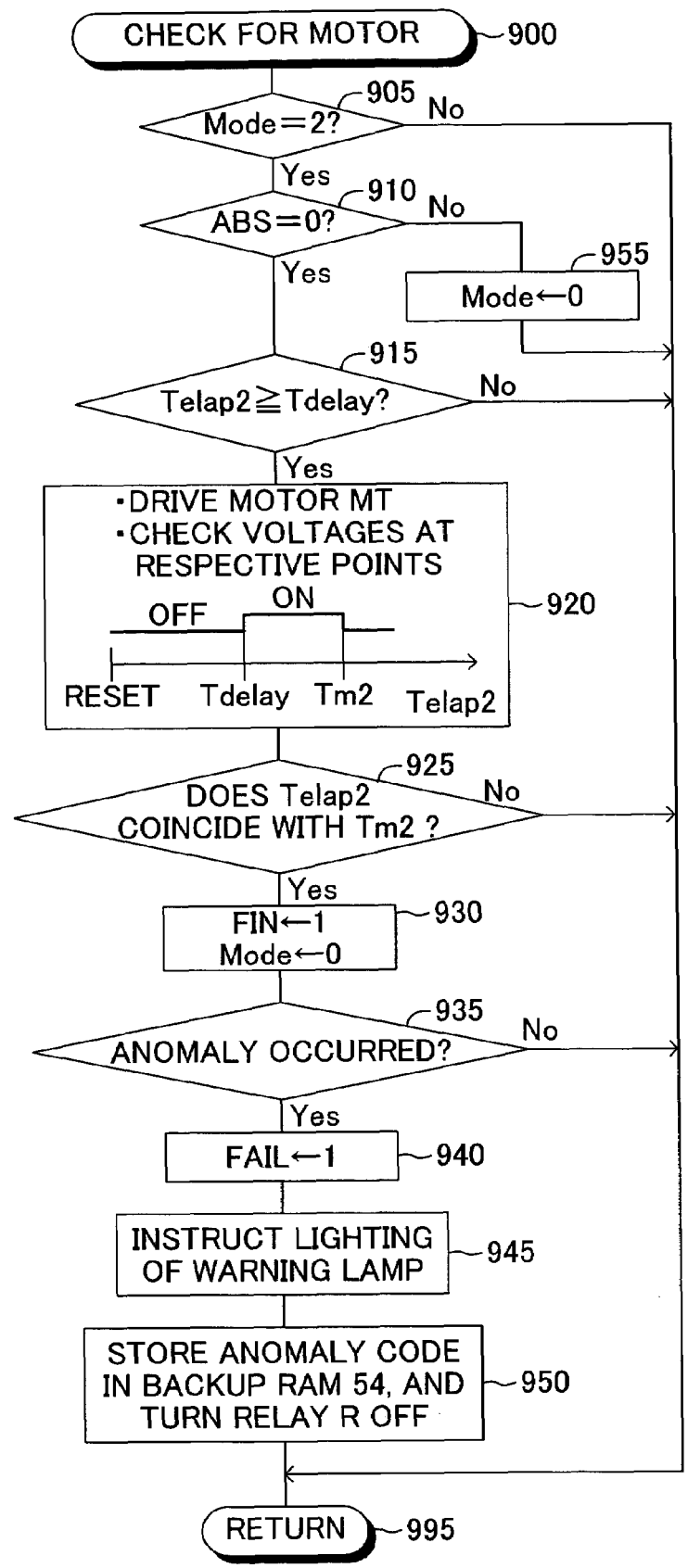
FIG. 9 is a flowchart showing a routine which the CPU shown in FIG. 1 executes in order to check the motor (operation in a second mode)

At predetermined time intervals, the CPU 51 repeatedly performs a routine shown in FIG. 7 for determining whether initial check is to be performed. Accordingly, when a predetermined timing is reached, the CPU 51 starts processing of the routine from Step 700, and proceeds to Step 705 so as to determine whether the IG has been switched from the OFF state to the ON state.

Here, the description is continued on the assumption that a present point in time is immediately after the IG has been switched from the OFF state to the ON state. In this case, the CPU 51 makes a "Yes" determination in Step 705, and proceeds to Step 710. In Step 710, the CPU 51 performs an initial setting operation in order to set to "0" the value of an operation mode indicator Mode which represents operation mode during initial check, the value of an ABS control execution flag ABS (which will be described later), the value of an anomaly flag FAIL (which will be described later), and the value of an initial check completion flag FIN (which will be described later).

The ABS control execution flag ABS represents that the ABS control is currently executed when its value is "1," and that the ABS control is not currently executed when its value is "0." The anomaly flag FAIL represents that an anomaly has occurred in the drive circuit (i.e., the brake hydraulic pressure control apparatus 30) when its value is "1," and that the brake hydraulic pressure control apparatus 30 is normal when its value is "0." The initial check completion flag FIN represents that the above-described initial check has been completed when its value is "1," and that the above-described initial check has not yet been completed when its value is "0."

Subsequently, the CPU 51 proceeds to Step 715 in order to determine whether both the value of the initial check completion flag FIN and the value of the operation mode indicator Mode are "0." Since both the value of the initial check completion flag FIN and the value of the operation mode indicator Mode are "0" at the present point in time, the CPU 51 makes a "Yes" determination in Step 715, and proceeds to Step 720. In Step 720, the CPU 51 determines whether a predetermined short period of time has elapsed after the IG is switched from the OFF state to the ON state.

Since the present point in time is immediately after the IG has been switched from the OFF state to the ON state, the CPU 51 makes a "No" determination in Step 720, and proceeds directly to Step 795 so as to end the current execution of the present routine. After that, the CPU 51 repeatedly executes the processing of Steps 700, 705, 715, 720, and 795 until the above-mentioned predetermined short period of time elapses.

Here, the predetermined short period of time is assumed to have elapsed. In this case, the CPU 51 makes a "Yes" determination is Step 720, and proceeds to Step 725 so as to determine whether the value of the ABS control execution flag ABS is "0." When the CPU 51 makes a "No" determination in Step 725, the CPU 51 proceeds directly to Step 795.

Here, the ABS control is assumed not to be executed, the CPU 51 makes a "Yes" determination in Step 725, and then proceeds to Step 730 so as to set the value of the operation mode indicator Mode to "1" for starting operation of the initial check in a first mode. Subsequently, in Step 735, the CPU 51 resets an unillustrated timer which is incorporated in the electronic controller 50 so as to clock a time Telap1 over which the operation in the first mode continues (elapsed time from time t0 in FIG. 4). After that, the CPU 51 proceeds to Step 795 so as to end the current execution of the present routine.

Since the value of the operation mode indicator Mode has been changed to "1" as the result of the above operation, after that point in time, the CPU 51 makes a "No" determination when it proceeds to Step 715, and proceeds directly to Step 795. In this manner, the initial check (operation in the first mode) for the brake hydraulic pressure control apparatus 30 is started under the conditions that the predetermined short period of time has elapsed after the IG is switched form the OFF state to the ON state, and the ABS control is not performed (see time t0 in FIG. 4).

Next, operation in the first mode (i.e., check for the solenoid valves) will be described. The CPU 51 repeatedly performs a routine shown in FIG. 8 at predetermined time intervals. Accordingly, when a predetermined timing is reached, the CPU 51 starts processing of the routine from Step 800, and proceeds to Step 805 so as to determine whether the value of the operation mode indicator Mode is "1." When the CPU 51 makes a "No" determination, the CPU 51 proceeds directly to Step 895 so as to end the current execution of the present routine.

Here, it is assumed that the present point in time is immediately after execution of the processing of the previously mentioned Step 730, and the ABS control is not performed. In this case, since the value of the operation mode indicator Mode is "1," the CPU 51 makes a "Yes" determination in Step 805, and proceeds to Step 810 so as to determine whether the value of the ABS control execution flag ABS is "0." Since in this case the CPU 51 makes a "Yes" determination in Step 810, the CPU 51 proceeds to Step 815.

In Step 815, with the elapsed time Telap1 for the first mode (elapsed time from time t0 in FIG. 4), the CPU 51 supplies to the base terminal of each power transistor Tr a drive signal (High-level signal or Low-level signal) for driving the respective solenoid valve (pressure-increasing valve PU or pressure-reducing valve PD) in accordance an activation pattern shown in the time chart of FIG. 4. Also, upon every arrival of a predetermined timing corresponding to the elapsed time Telap1 for the first mode, the CPU 51 successively detects the above-mentioned various electrical potentials (potentials Vs, Vu, Vd, and Vmt shown in FIG. 3) in each stage, and determines in each stage whether all the detected electrical potentials assume proper values.

Subsequently, the CPU 51 proceeds to Step 820 so as to determine whether the elapsed time Telap1 for the first mode coincides with the above-mentioned time Tm1 (see FIG. 4). Since the present point in time is immediately after the operation in the first mode has started, the CPU 51 makes a "No" determination in Step 820, and proceeds directly to Step 895.

After that, the CPU 51 repeatedly executes the processing of Steps 800, 805, 810, 815, 820, and 895 until the elapsed time Telap1 for the first mode coincides with the above-mentioned time Tm1 (i.e., the operation in the first mode ends). As a result, the levels of the drive signals for driving the respective solenoid valves are successively changed in accordance with the above-mentioned pattern with the elapsed time Telap1 for the first mode.

When the elapsed time Telap1 for the first mode coincides with the above-mentioned time Tm1 (see time t2 in FIG. 4), the CPU 51 makes a "Yes" determination when it proceeds to Step 820, and then proceeds to Step 825. In Step 825, the CPU 51 sets the value of the operation mode indicator Mode to "2" for starting operation of the initial check in a second mode. Subsequently, in Step 830, the CPU 51 resets an unillustrated timer which is incorporated in the electronic controller 50 so as to clock a time Telap2 over which the operation in the second mode continues (elapsed time from time t2 in FIG. 4). After that, the CPU 51 proceeds to Step 895 so as to end the current execution of the present routine.

Since the value of the operation mode indicator Mode has been changed to "2" as the result of the above operation, after that point in time, the CPU 51 makes a "No" determination when it proceeds to Step 805, and proceeds directly to Step 895. Notably, in this case as well, the CPU 51 continuously makes a "No" determination when it proceeds to Step 715 of FIG. 7. In this manner, the operation in the first mode ends, and the operation in the second mode starts.

Next, there will be described the case where ABS control is started during a period in which the value of the operation mode indicator Mode is maintained at "1" (i.e., the operation in the first mode is executed). In this case, since the value of the ABS control execution flag ABS is changed from "0" to "1" by a routine to be described later, the CPU 51 makes a "No" determination when it proceeds to Step 810, and then proceeds to Step 835 so as to set the value of the operation mode indicator Mode to "0."

As a result, the CPU 51 makes a "No" determination when it proceeds to Step 805, and makes a "Yes" determination when its proceeds to Step 715 of FIG. 7. As a result, the operation in the first mode (i.e., initial check) is interrupted, and after completion of the ABS control, the operation in the first mode (i.e., initial check) is resumed from the beginning.

Next, operation in the second mode (i.e., check for the motor MT) will be described. The CPU 51 repeatedly performs a routine shown in FIG. 9 at predetermined time intervals. Accordingly, when a predetermined timing is reached, the CPU 51 starts processing of the routine from Step 900, and proceeds to Step 905 so as to determine whether the value of the operation mode indicator Mode is "2." When the CPU 51 makes a "No" determination, the CPU 51 proceeds directly to Step 995 so as to end the current execution of the present routine.

Here, it is assumed that the present point in time is immediately after execution of the processing of the previously mentioned Step 825 (see time t2 in FIG. 4), and the ABS control is not performed. In this case, since the value of the operation mode indicator Mode is "2," the CPU 51 makes a "Yes" determination in Step 905, and proceeds to Step 910 so as to determine whether the value of the ABS control execution flag ABS is "0." Since in this case the CPU 51 makes a "Yes" determination in Step 910, the CPU 51' proceeds to Step 915.

In Step 915, the CPU 51 determines whether the elapsed time Telap2 for the second mode (elapsed time from time t2 in FIG. 4) becomes equal to or greater than the above-mentioned delay time Tdelay. Since the present point in time is immediately after start of the operation in the second mode, the CPU 51 makes a "No" determination in Step 915, and proceeds directly to Step 995. After that, the CPU 51 repeatedly executes the processing of Steps 900, 905, 910, 915, and 995 until the elapsed time Telap2 for the second mode reaches the delay time Tdelay.

When the elapsed time Telap2 for the second mode reaches the delay time Tdelay, the CPU 51 makes a "Yes" determination when it proceeds to Step 915, and then proceeds to Step 920. In Step 920, with the elapsed time Telap2 for the second mode, the CPU 51 supplies to the base terminal of the power transistor Trmt a drive signal (High-level signal or Low-level signal) for driving the motor MT in accordance an activation pattern shown in the time chart of FIG. 4. Also, upon every arrival of a predetermined timing corresponding to the elapsed time Telap2 for the second mode, the CPU 51 successively detects the above-mentioned various electrical potentials (potentials Vs, Vu, Vd, and Vmt shown in FIG. 3) in each stage, and determines in each stage whether all the detected electrical potentials assume proper values.

Subsequently, the CPU 51 proceeds to Step 925 so as to determine whether the elapsed time Telap2 for the second mode coincides with the above-mentioned time Tm2 (see FIG. 4). Since the present point in time is immediately after the operation in the second mode has reached the delay time Tdelay, the CPU 51 makes a "No" determination in Step 925, and proceeds directly to Step 995.

After that, the CPU 51 repeatedly executes the processing of Steps 900, 905, 910, 915, 920, 925, and 995 until the elapsed time Telap2 for the second mode coincides with the above-mentioned time Tm2 (i.e., the operation in the second mode ends). As a result, the level of the drive signal for driving the motor MT is changed in accordance with the above-mentioned pattern with the elapsed time Telap2 for the second mode.

When the elapsed time Telap2 for the second mode coincides with the above-mentioned time Tm2 (see time t4 in FIG. 4), the CPU 51 makes a "Yes" determination when it proceeds to Step 925, and then proceeds to Step 930. In Step 930, the CPU 51 sets the value of the initial check completion flag FIN to "1" and the value of the operation mode indicator Mode to "0."

Subsequently, the CPU 51 proceeds to Step 935 so as to determine, on the basis on the result of checking of the respective electrical potentials performed nine times in total during the operations in the first and second modes, whether wire breakage, short circuit, or the like has occurred in the drive circuit shown in FIG. 3 (i.e., whether an anomaly has occurred in the brake hydraulic pressure control apparatus 30). When the CPU 51 determines that no anomaly has occurred, the CPU 51 proceeds directly to Step 995.

As a result of the processing of Step 930, after this point in time, the CPU 51 makes a "No" determination when it proceeds to Step 905, and then proceeds directly to Step 995. Further, since the value of the initial check completion flag FIN is "1," the CPU 51 continuously makes a "No" determination when it proceeds to Step 715 of FIG. 7. In this manner, the operation in the second mode (accordingly, the initial check) ends, and the initial check operation will not be executed again insofar as the IG is maintained in the ON state.

Meanwhile, when anomaly has occurred, the CPU 51 makes a "Yes" determination in Step 935, and proceeds to Step 940 so as to change the value of the anomaly flag FAIL from "0" to "1." Subsequently, in Step 945, the CPU 51 outputs a lighting signal to the warning lamp 42. After that, in Step 950, the CPU 51 stores an anomaly code corresponding to the details of the anomaly in the backup RAM 54, and turns the relay R off. The CPU 51 then proceeds to Step 995. In this case as well, as in the above-mentioned case where anomaly is judged not to have occurred, the initial check operation ends, and the initial check operation will not be executed again insofar as the IG is maintained in the ON state.

Next, there will be described the case where ABS control is started during a period in which the value of the operation mode indicator Mode is maintained at "2" (i.e., the operation in the second mode is executed). In this case, since the value of the ABS control execution flag ABS is changed from "0" to "1" by the routine to be described later, the CPU 51 makes a "No" determination when it proceeds to Step 910, and then proceeds to Step 955 so as to set the value of the operation mode indicator Mode to "0."

As a result, the CPU 51 makes a "No" determination when it proceeds to Step 905, and makes a "Yes" determination when its proceeds to Step 715 of FIG. 7. As a result, the operation in the second mode (i.e., initial check) is interrupted, and after completion of the ABS control, the operation in the first mode (i.e., initial check) is resumed from the beginning.

Figure 10:
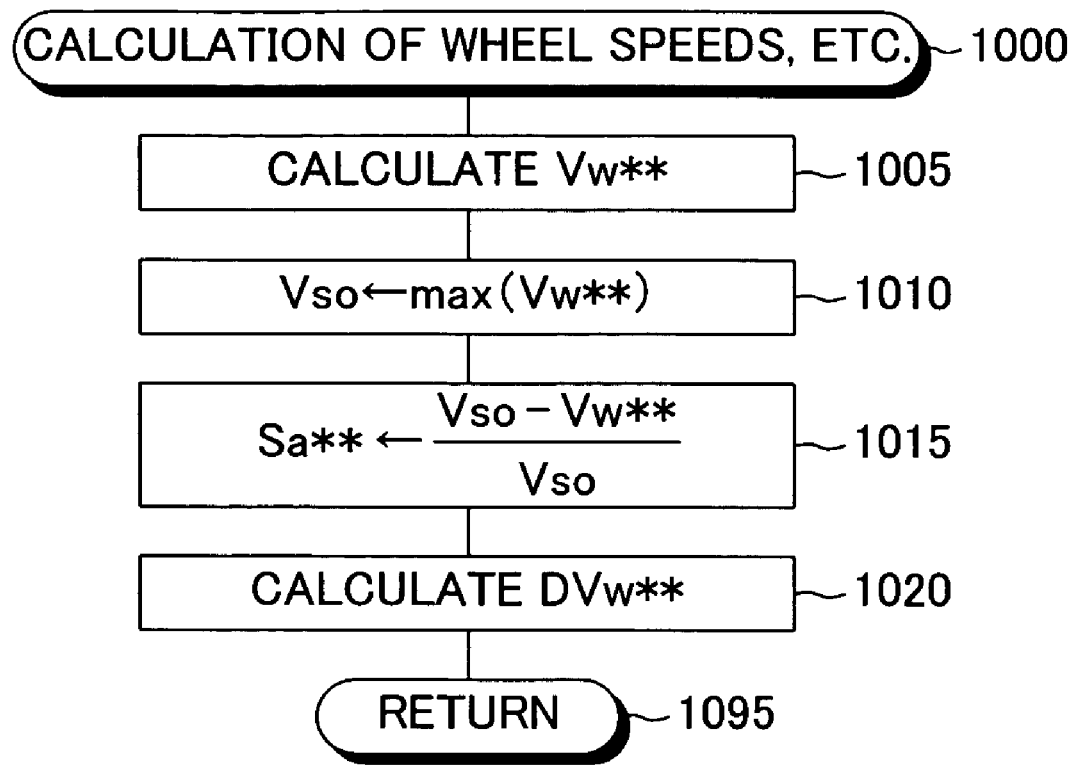
FIG. 10 is a flowchart showing a routine which the CPU shown in FIG. 1 executes in order to calculate wheel speed and other parameters.
Figure 11:
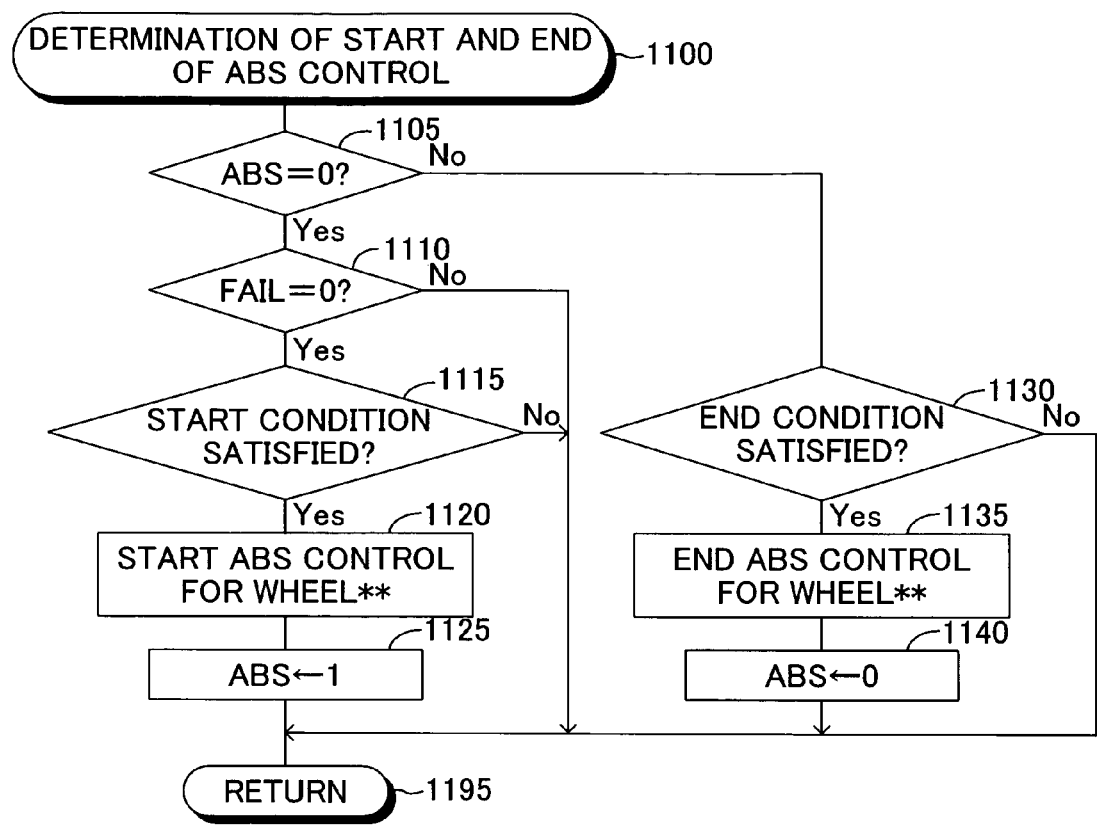
FIG. 11 is a flowchart showing a routine which the CPU shown in FIG. 1 executes in order to perform judgment on start and end of ABS control.

Moreover, at predetermined time intervals, the CPU 51 repeatedly performs a routine shown in FIG. 10 for calculating wheel speed Vw, etc. Accordingly, when a predetermined timing is reached, the CPU 51 starts processing of the routine from Step 1000, and proceeds to Step 1005 so as to calculate the wheel speed Vw of the wheel (the speed of the outer periphery of the wheel). Specifically, the CPU 51 calculates the wheel speed Vw on the basis of the time intervals between pulses of a signal which each wheel speed sensor 41**** outputs.

Next, the CPU 51 proceeds to Step 1010 and calculates the highest value among the wheel speeds Vw as the estimated vehicle body speed Vso. Alternatively, the average of the wheel speeds Vw may be calculated as the estimated vehicle body speed Vso. Subsequently, the CPU 51 proceeds to Step 1015 and calculates the actual slip rate Sa of the wheel on the basis of the value of the estimated vehicle body speed Vso calculated in Step 1010, the value of the wheel speed Vw calculated in Step 1005, and the equation shown in the box of Step 1015**.

Subsequently, the CPU 51 proceeds to Step 1020 and calculates the wheel acceleration DVw of the wheel, which is a time-differentiated value of the wheel speed Vw, in accordance with the following Eq. 1. Subsequently, the CPU 51 proceeds to Step 1095 so as to end the present routine. After that, the CPU 51** repeatedly executes the present routine.

$$DVw^{}=(Vw^{}-Vwl^{**})/\Delta t \qquad \text{Eq. 1}$$

In Eq. 1, Vwl represents the wheel speed Vw calculated in Step 1005 during the previous execution of the present routine, and $\Delta t$ represents the length of the above-described, predetermined intervals (the computation cycles of the CPU 51).

Next, operation for determining start and end of ABS control will be described. The CPU 51 repeatedly performs a routine shown in FIG. 11 at predetermined time intervals. Accordingly, when a predetermined timing is reached, the CPU 51 starts processing of the routine from Step 1100, and proceeds to Step 1105 so as to determine whether the value of the ABS control execution flag ABS is "0."

The description will be continued on the assumption that the ABS control is currently halted, the results of the initial check show that the brake hydraulic pressure control apparatus 30 is normal, and ABS control start conditions, which will be described later, have not been satisfied. In this case, since the value of the ABS control execution flag ABS has been set to "0," the CPU 51 makes a "Yes" determination in Step 1105, and then proceeds to Step 1110 in order to determine whether the value of the anomaly flag FAIL is "0." In this case, the CPU 51 makes a "Yes" determination in Step 1110, and then proceeds to Step 1115 in order to determine whether the ABS control start conditions are satisfied.

The ABS control start conditions are satisfied when, for example, the absolute value of the latest wheel acceleration DVw of a specific wheel (at least one wheel) calculated in the previous Step 1020 (wheel deceleration |DVw|) is greater than a predetermined deceleration reference value DVwref (positive value), and the latest actual slip rate Sa of the specific wheel calculated in the previous Step 1015 is greater than a predetermined slip rate reference value Sref (positive value).

At the present stage, as described above, the ABS control start conditions are not satisfied. Therefore, the CPU 51 makes a "No" determination in Step 1115, and immediately proceeds to Step 1195 in order to end the present routine. After that, until the ABS control start conditions are satisfied, the CPU 51 repeatedly executes the processing of Steps 1100 to 1110 and Step 1195 at the predetermined intervals.

Next, the description will be continued on the assumption that the ABS control start conditions are satisfied in this state. In this case, the CPU 51 makes a "Yes" determination when it proceeds to Step 1115, and then proceeds to Step 1120 in order to start ABS control for a wheel corresponding to the specific wheel. In Step 1125 subsequent to Step 1120, the CPU 51 sets the value of the ABS control execution flag ABS to "1." After that, the CPU 51 proceeds to Step 1195** so as to end the current execution of the present routine.

Since the value of the ABS control execution flag ABS has been set to "1," the CPU 51 makes a "No" determination when it proceeds to Step 1105, and then proceeds to Step 1130 in order to determine whether predetermined ABS control end conditions are satisfied. Since the present stage is immediately after the ABS control has been started, the ABS control end conditions are not satisfied. Therefore, the CPU 51 makes a "No" determination in Step 1130, and immediately proceeds to Step 1195 in order to end the current execution of the present routine.

After that, until the ABS control end conditions are satisfied, the CPU 51 repeatedly executes the processing of Steps 1100, 1105, 1130, and 1195 at the predetermined intervals. In other words, the value of the ABS control execution flag ABS is maintained at "1" during execution of the ABS control.

Next, the description will be continued on the assumption that the ABS control end conditions are satisfied in this state. In this case, the CPU 51 makes a "Yes" determination when it proceeds to Step 1130, and then proceeds to Step 1135 in order to stop the ABS control performed for all the wheels\*\*. In Step 1140 subsequent to Step 1135, the CPU 51 sets the value of the ABS control execution flag ABS to "0." After that, the CPU 51 proceeds to Step 1195 so as to end the current execution of the present routine.

Since the ABS control execution flag ABS has been set to "0" as a result of the processing of Step 1140, the CPU 51 makes a "Yes" determination when it proceeds to Step 1105, and then proceeds to Step 1110. In Step 1110, the CPU 51 again makes a "Yes" determination, and then proceeds to Step 1115 in order to again perform monitoring for determining whether the ABS control start conditions are satisfied. Until the ABS control start conditions are again satisfied, the CPU 51 repeatedly executes the processing of Steps 1100 to 1115 and 1195. In other words, the value of the ABS control execution flag ABS is maintained at "0" while the ABS control is stopped.

Next, there will be described the case where the results of the initial check show that an anomaly has occurred in the brake hydraulic pressure control apparatus 30. In this case, since the value of the anomaly flag FAIL has been set to "1" as a result of execution of the previously described Step S940, the CPU 51 makes a "No" determination when it proceeds to Step 1110, and then proceeds directly to Step 1195. Accordingly, the processing of Step 1115 (accordingly, Step 1125) is not performed, whereby ABS control is not started, and the value of the ABS control execution flag ABS is maintained at "0."

As described above, in the failure check apparatus for a vehicle control apparatus (brake hydraulic pressure control apparatus) according to the present invention, when initial check for the brake hydraulic pressure control apparatus 30 is performed, the solenoid valves (pressure-increasing valves PU\*\* and pressure-reducing valves PD\*\*) and the motor MT (i.e., actuators) provided in the brake hydraulic pressure control apparatus 30 are successively driven (actually activated), one at a time, for a predetermined period of time so as to determine whether a failure, such as wire breakage or short circuit, has occurred in the actuator drive circuit shown in FIG. 3, to thereby determine whether a failure has occurred in the brake hydraulic pressure control apparatus 30.

During such failure check, operation of the motor MT is started after the delay time Tdelay elapses after completion of activation of the respective solenoid valves, the delay time Tdelay corresponding to a convergence time required for convergence of vibration generated in the body vibration transmission system upon activation of the solenoid valves. Accordingly, interference between a vibration wave (sound wave) generated upon actuation of the solenoid valves and a vibration wave (sound wave) generated upon actuation of the motor MT, which differ in nature of vibration, is prevented, and no harmonic distortion is generated in the body vibration transmission system. As a result, the sound quality of operation sound transmitted to the ears of a vehicle occupant is improved, so that the operation sound is not harsh to the ears. Thus, the unpleasant sensation given to the occupant by the operation sound can be mitigated.

The present invention is not limited to the above-described embodiment, and various modifications may be practiced without departing from the scope of the present invention. For example, in the above-described embodiment, the initial check for the brake hydraulic pressure control apparatus is performed in such a manner that the solenoid valves are first activated, and then the motor is activated after convergence of a vibration generated in the body vibration transmission system upon activation of the solenoid valves. However, the initial check may be performed in such a manner that the motor is first activated, and then, the solenoid valves are activated after convergence of a vibration generated in the body vibration transmission system upon activation of the motor MT.

In the above-described embodiment, the present invention is applied to the brake hydraulic pressure control apparatus (specifically, ABS). However, the present invention may be applied to any control apparatus of a vehicle insofar as the control apparatus includes actuators of two or more types which differ from each other in terms of nature of vibration generated in the body vibration transmission system upon activation thereof.

What is claimed is:

1. A failure check apparatus for a control apparatus mounted on a body of a vehicle and including actuators of different types which differ in nature of vibration generated in the control apparatus upon activation thereof, comprising:

failure check means for activating the actuators in a pattern for failure check so as to determine whether a failure has occurred in the control apparatus, wherein the failure check means successively activates the actuators, one type at a time, in such a manner that an actuator of a first type is first activated, and an actuator of a second type then starts to be activated at a point of time when a time period of 100 millisecond to 500 millisecond elapses after the end of activation of the actuator of the first type.

2. A failure check apparatus according to claim 1, wherein the control apparatus is an antilock brake system which prevents locking of wheels during travel of the vehicle and which includes actuators of two types; and the actuator of the first type includes a plurality of solenoid valves for adjusting brake hydraulic pressures within respective wheel cylinders of the wheels, and the actuator of the second type includes a motor for driving a hydraulic pump which pumps brake fluid discharged to a reservoir as a result of operation of the antilock brake system.

3. A failure check apparatus according to claim 1, wherein the failure check means performs the failure check for the control apparatus within a predetermined period after startup of the control apparatus.

4. A failure check apparatus according to claim 1, wherein the time period is a convergence time of the vibration generated in the control apparatus upon activation of the actuator of the first type.

5. A failure check apparatus according to claim 1, wherein a waveform of a vibration generated in the control apparatus upon activation of the actuator of the first type and a waveform of a vibration generated in the control apparatus upon activation of the actuator of the second type have a relationship so that a resultant combined waveform includes harmonic distortion, wherein the distortion is avoided by delaying the activation of the second type of actuator until the vibration generated by the first type of actuator has converged.

6. A failure check apparatus according to claim 1, wherein the actuator of the first type includes a plurality of operating devices; when the failure check means activates the actuator of the first type, the failure check means successively activates the operating devices, one device at a time, in such a manner that after completion of activation of one operating device, activation of a next operating device is started before convergence of a vibration generated in the control apparatus upon activation of the one operating device; and when activation of the last one of the operating devices ends, the failure check means activates the actuator of the second type when the time period elapses after the end of activation of the last operating device.

7. A failure check apparatus according to claim 1, wherein the time period is a convergence time of the vibration generated in a body vibration transmission system upon activation of the actuator of the first type in a state in which the control apparatus is mounted on the body of the vehicle.

8. A failure check apparatus according to claim 2, wherein the failure check means successively activates the solenoid valves, one valve at a time, in such a manner that each valve is activated for a predetermined time and when activation of one valve ends, activation of a next valve is started continuously; and when activation of the last one of the valves ends, the failure check means activates the motor when the time period elapses after the end of activation of the last valve, wherein the predetermined time is shorter than the time period.

9. A failure check apparatus according to claim 8, wherein the predetermined time is 3 millisecond.

10. A failure check apparatus according to claim 1, wherein;

the control apparatus includes actuators of two types; and
the actuator of the first type includes a plurality of solenoid valves, and the actuator of the second type includes a motor for driving a hydraulic pump.

11. A failure check apparatus for a control apparatus mounted on a body of a vehicle and including actuators of different types which differ in nature of vibration generated in the control apparatus upon activation thereof, comprising:

failure check means for activating the actuators in a pattern for failure check so as to determine whether a failure has occurred in the control apparatus, wherein the failure check means successively activates the actuators, one type at a time, in such a manner that an actuator of a first type is first activated, and activation of an actuator of a second type is immediately started when a time period of 100 millisecond to 500 millisecond ends, the time period beginning at a point in time when the activation of the actuator of the first type ends.

12. A failure check apparatus according to claim 11, wherein the actuator of the first type includes a plurality of operating devices; and when the failure check means activates the actuator of the first type, the failure check means successively activates the operating devices, one device at a time, in such a manner that after completion of activation of one operating device, activation of a next operating device is started before convergence of a vibration generated in the control apparatus upon activation of the one operating device; and when activation of the last one of the operating devices ends, the failure check means immediately starts activating the actuator of the second type when the time period elapses after the end of activation of the last operating device.

13. A failure check apparatus according to claim 11, wherein the control apparatus is an antilock brake system which prevents locking of wheels during travel of the vehicle; and the actuator of the first type includes a plurality of solenoid valves for adjusting brake hydraulic pressures within respective wheel cylinders of the wheels, and an actuator of the second type includes a motor for driving a hydraulic pump which pumps brake fluid discharged to a reservoir as a result of operation of the antilock brake system.

14. A failure check apparatus according to claim 11, wherein the failure check means performs the failure check for the control apparatus within a predetermined period after startup of the control apparatus.

15. A failure check apparatus according to claim 11, wherein the actuator of the first type includes a plurality of solenoid valves and the actuator of the second type includes a motor for driving a hydraulic pump.

* * * * *